(12) United States Patent  
Wright et al.

(10) Patent No.: US 8,723,827 B2  
(45) Date of Patent: May 13, 2014

(54) PREDICTIVE TOUCH SURFACE SCANNING

(75) Inventors: David G. Wright, San Diego, CA (US); Steven Kolokowsky, San Diego, CA (US); Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/591,145

(22) Filed: Aug. 21, 2012

(65) Prior Publication Data

US 2013/0100071 A1     Apr. 25, 2013

Related U.S. Application Data

(63) Continuation-in-part of application No. 13/250,379, filed on Sep. 30, 2011, which is a continuation-in-part of application No. 12/844,798, filed on Jul. 27, 2010.

(60) Provisional application No. 61/557,148, filed on Nov. 8, 2011, provisional application No. 61/229,236, filed on Jul. 28, 2009.

(51) Int. Cl.  
*G06F 3/041* (2006.01)

(52) U.S. Cl.  
USPC .......................................... 345/173; 345/156

(58) Field of Classification Search  
USPC ................................................ 345/156–174  
See application file for complete search history.

(56) References Cited

U.S. PATENT DOCUMENTS

| | | |
|---|---|---|
| 4,433,378 A | 2/1984 | Leger |
| 4,841,526 A | 6/1989 | Wilson et al. |
| 4,843,023 A | 6/1989 | Chiu et al. |
| 4,918,262 A | 4/1990 | Flowers et al. |
| 4,935,728 A | 6/1990 | Kley |
| 5,239,140 A | 8/1993 | Kuroda et al. |
| 5,319,648 A | 6/1994 | Bux et al. |
| 5,374,787 A | 12/1994 | Miller et al. |
| 5,386,412 A | 1/1995 | Park et al. |
| 5,405,791 A | 4/1995 | Ahmad et al. |
| 5,495,077 A | 2/1996 | Miller et al. |
| 5,648,642 A | 7/1997 | Miller et al. |
| 5,825,352 A | 10/1998 | Bisset et al. |
| 5,841,078 A | 11/1998 | Miller et al. |
| 5,872,561 A | 2/1999 | Figie et al. |
| 5,920,309 A | 7/1999 | Bisset et al. |

(Continued)

FOREIGN PATENT DOCUMENTS

WO    2012177571 A    12/2012

OTHER PUBLICATIONS

International Search Report for International Application No. PCT/US12/64222 dated Dec. 19, 2012; 4 pages.

(Continued)

*Primary Examiner* — Christopher E Leiby

(57) ABSTRACT

A method for locating a conductive object at a touch-sensing surface may include detecting a first resolved location for the conductive object at the touch-sensing surface based on a first scan of the touch-sensing surface, predicting a location for the conductive object, and determining a second resolved location for the conductive object by performing a second scan of a subset of sensor electrodes of the touch-sensing surface, wherein the subset of sensor electrodes is selected based on the predicted location of the conductive object.

20 Claims, 9 Drawing Sheets

(56) References Cited

U.S. PATENT DOCUMENTS

| | | | |
|---|---|---|---|
| 5,920,572 A | 7/1999 | Washington et al. | |
| 5,930,830 A | 7/1999 | Mendelson et al. | |
| 6,008,486 A | 12/1999 | Stam et al. | |
| 6,219,279 B1 | 4/2001 | Manolescu et al. | |
| 6,255,638 B1 | 7/2001 | Eraluoto et al. | |
| 6,292,173 B1 | 9/2001 | Rambaldi et al. | |
| 6,396,484 B1 | 5/2002 | Adler et al. | |
| 6,762,752 B2 | 7/2004 | Perski et al. | |
| 7,019,672 B2 | 3/2006 | Ely | |
| 7,100,430 B2 | 9/2006 | Samsavar et al. | |
| 7,307,485 B1 | 12/2007 | Snyder et al. | |
| 7,375,535 B1 | 5/2008 | Kutz et al. | |
| 7,428,191 B1 | 9/2008 | Klein | |
| 7,982,723 B2* | 7/2011 | Ningrat | 345/174 |
| 8,120,591 B2 | 2/2012 | Krah et al. | |
| 8,305,357 B2 | 11/2012 | Liao et al. | |
| 8,315,832 B1 | 11/2012 | Seguine | |
| 8,350,826 B2 | 1/2013 | Watanabe | |
| 8,436,831 B2 | 5/2013 | Wei et al. | |
| 8,462,127 B2 | 6/2013 | Chiu et al. | |
| 2001/0049726 A1 | 12/2001 | Comeau et al. | |
| 2002/0009100 A1 | 1/2002 | Raghavan et al. | |
| 2002/0015024 A1 | 2/2002 | Westerman et al. | |
| 2002/0024606 A1 | 2/2002 | Yuki et al. | |
| 2002/0191543 A1 | 12/2002 | Buskirk et al. | |
| 2003/0120664 A1 | 6/2003 | Davidson et al. | |
| 2003/0214468 A1 | 11/2003 | Inukai | |
| 2004/0056831 A1 | 3/2004 | Takatori et al. | |
| 2004/0064589 A1 | 4/2004 | Boucher et al. | |
| 2004/0071030 A1 | 4/2004 | Goda et al. | |
| 2004/0196847 A1 | 10/2004 | Kuwabara | |
| 2004/0227196 A1 | 11/2004 | Yoneda | |
| 2005/0013492 A1 | 1/2005 | Hattori | |
| 2005/0068044 A1 | 3/2005 | Peine et al. | |
| 2005/0129292 A1 | 6/2005 | Morgeneier et al. | |
| 2005/0134292 A1 | 6/2005 | Knoedgen | |
| 2006/0161871 A1 | 7/2006 | Hotelling et al. | |
| 2006/0192690 A1 | 8/2006 | Philipp | |
| 2006/0197752 A1 | 9/2006 | Hurst et al. | |
| 2006/0219692 A1 | 10/2006 | Unsworth | |
| 2006/0226490 A1 | 10/2006 | Burnett et al. | |
| 2007/0008299 A1 | 1/2007 | Hristov | |
| 2007/0121959 A1 | 5/2007 | Philipp | |
| 2007/0182718 A1 | 8/2007 | Schoener et al. | |
| 2007/0188518 A1 | 8/2007 | Vale | |
| 2007/0229468 A1 | 10/2007 | Peng et al. | |
| 2007/0229470 A1 | 10/2007 | Snyder et al. | |
| 2007/0235231 A1 | 10/2007 | Loomis et al. | |
| 2007/0273659 A1 | 11/2007 | Xiaoping et al. | |
| 2008/0024455 A1 | 1/2008 | Lee et al. | |
| 2008/0048997 A1* | 2/2008 | Gillespie et al. | 345/174 |
| 2008/0057644 A1 | 3/2008 | Kwak et al. | |
| 2008/0079699 A1 | 4/2008 | Mackey | |
| 2008/0150906 A1* | 6/2008 | Grivna | 345/173 |
| 2008/0158180 A1 | 7/2008 | Krah et al. | |
| 2008/0246723 A1 | 10/2008 | Baumbach | |
| 2008/0277171 A1 | 11/2008 | Wright | |
| 2009/0009485 A1 | 1/2009 | Bytheway | |
| 2009/0096757 A1* | 4/2009 | Hotelling et al. | 345/173 |
| 2009/0128516 A1* | 5/2009 | Rimon et al. | 345/174 |
| 2009/0160787 A1* | 6/2009 | Westerman et al. | 345/173 |
| 2009/0273579 A1 | 11/2009 | Zachut et al. | |
| 2009/0284495 A1 | 11/2009 | Geaghan et al. | |
| 2009/0309851 A1 | 12/2009 | Bernstein | |
| 2010/0007631 A1* | 1/2010 | Chang | 345/174 |
| 2010/0039405 A1* | 2/2010 | Chen et al. | 345/174 |
| 2010/0073301 A1* | 3/2010 | Yousefpor et al. | 345/173 |
| 2010/0073318 A1* | 3/2010 | Hu et al. | 345/173 |
| 2010/0097328 A1* | 4/2010 | Simmons et al. | 345/173 |
| 2010/0117981 A1* | 5/2010 | Chen et al. | 345/174 |
| 2010/0155153 A1 | 6/2010 | Zachut | |
| 2010/0292945 A1 | 11/2010 | Reynolds et al. | |
| 2010/0315375 A1 | 12/2010 | Yang | |
| 2011/0025629 A1 | 2/2011 | Grivna et al. | |
| 2012/0105362 A1 | 5/2012 | Kremin et al. | |
| 2012/0154324 A1 | 6/2012 | Wright et al. | |
| 2012/0162124 A1 | 6/2012 | Lin | |
| 2012/0242612 A1 | 9/2012 | Chang | |
| 2012/0261199 A1 | 10/2012 | Kuo et al. | |
| 2012/0268415 A1 | 10/2012 | Konovalov et al. | |
| 2012/0280929 A1 | 11/2012 | Rimon et al. | |
| 2012/0327042 A1 | 12/2012 | Harley et al. | |
| 2013/0100071 A1 | 4/2013 | Wright et al. | |

OTHER PUBLICATIONS

USPTO Advisory Action for U.S. Appl. No. 12/844,798 dated May 9, 2013; 3 pages.

USPTO Advisory Action for U.S. Appl. No. 12/844,798 dated Aug. 23, 2012; 3 pages.

USPTO Advisory Action for U.S. Appl. No. 12/844,798 dated Apr. 10, 2013, 3 pages.

USPTO Final Rejection for U.S. Appl. No. 12/844,798 dated Feb. 13, 2013; 19 pages.

USPTO Final Rejection for U.S. Appl. No. 12/844,798 dated Jun. 18, 2012, 21 pages.

USPTO Non-Final Rejection for U.S. Appl. No. 12/844,798 dated Feb. 14, 2012; 18 pages.

USPTO Non-Final Rejection for U.S. Appl. No. 12/844,798 dated Jul. 11, 2013; 23 pages.

USPTO Non-Final Rejection for U.S. Appl. No. 12/844,798 dated Oct. 10, 2012; 19 pages.

Written Opinion of the International Searching Authority for International Application No. PCT/US12/64222 mailed Dec. 19, 2012; 7 pages.

U.S. Appl. No. 12/167,494: "Method for Improving Scan Time and Sensitivity in Touch Sensitive User Interface Device" Ryan D. Seguine et al., filed Jul. 3, 2008; 42 pages.

U.S. Appl. No. 12/844,798 "Dynamic Mode Switching for Fast Touch Response," Edward Grivna et al., filed Jul. 27, 2010; 65 pages.

U.S. Appl. No. 13/250,379: "Predictive Touch Surface Scanning" David G. Wright et al., filed Sep. 30, 2011; 60 pages.

U.S. Appl. No. 13/741,090: "Multi-Stage Stylus Scanning," Ruslan Omelchuk, filed Jan. 14, 2013; 58 pages.

International Search Report for International Application No. PCT/US08/69108 dated Sep. 26, 2008; 2 pages.

International Search Report for International Application No. PCT/US10/43590 dated Sep. 27, 2010; 2 pages.

USPTO Advisory Action for U.S. Appl. No. 12/167,494 dated May 27, 2011; 3 pages.

USPTO Advisory Action for U.S. Appl. No. 12/167,494 dated Aug. 10, 2012; 3 pages.

USPTO Advisory Action for U.S. Appl. No. 12/844,798 dated Dec. 30, 2013; 3 pages.

USPTO Advisory Action for U.S. Appl. No. 13/250,379 dated Jun. 3, 2013; 3 pages.

USPTO Advisory Action for U.S. Appl. No. 13/250,379 dated Dec. 2, 2013; 3 pages.

USPTO Final Rejection for U.S. Appl. No. 12/167,494 dated Mar. 15, 2011; 15 pages.

USPTO Final Rejection for U.S. Appl. No. 12/167,494 dated May 30, 2012; 16 pages.

USPTO Final Rejection for U.S. Appl. No. 12/844,798 dated Oct. 7, 2013; 24 pages.

USPTO Final Rejection for U.S. Appl. No. 13/250,379 dated Apr. 3, 2013; 19 pages.

USPTO Final Rejection for U.S. Appl. No. 13/250,379 dated Oct. 3, 2013; 22 pages.

USPTO Final Rejection for U.S. Appl. No. 13/950,672 dated Jan. 2, 2014; 17 pages.

USPTO Non Final Rejection for U.S. Appl. No. 12/844,798 dated Feb. 4, 2014; 27 pages.

USPTO Non-Final Rejection for U.S. Appl. No. 12/167,494 dated Aug. 4, 2010; 12 pages.

USPTO Non-Final Rejection for U.S. Appl. No. 12/167,494 dated Nov. 15, 2012; 20 pages.

USPTO Non-Final Rejection for U.S. Appl. No. 12/167,494 dated Nov. 30, 2011; 17 pages.

(56) References Cited

OTHER PUBLICATIONS

USPTO Non-Final Rejection for U.S. Appl. No. 13/250,379 dated Jul. 11, 2013; 20 pages.
USPTO Non-Final Rejection for U.S. Appl. No. 13/250,379 dated Oct. 16, 2012; 16 pages.
USPTO Non-Final Rejection for U.S. Appl. No. 13/950,672 dated Sep. 9, 2013; 17 pages.
USPTO Notice of Allowance for U.S. Appl. No. 12/167,494 dated Apr. 12, 2013; 9 pages.
USPTO Notice of Allowance for U.S. Appl. No. 12/167,494 dated May 31, 2013; 16 pages.
USPTO Notice of Allowance for U.S. Appl. No. 12/167,494 dated Jun. 24, 2013; 10 pages.
USPTO Notice of Allowance for U.S. Appl. No. 13/250,379 dated Jan. 6, 2014; 11 pages.
Written Opinion of the International Searching Authority for International Application No. PCT/US08/69108 dated Sep. 26, 2008; 4 pages.
Written Opinion of the International Searching Authority for International Application No. PCT/US10/43590 mailed Sep. 27, 2010; 5 pages.

\* cited by examiner

PREDICTIVE TOUCH SURFACE SCANNING

RELATED APPLICATIONS

This application claims priority to U.S. Provisional Application No. 61/557,148, filed on Nov. 8, 2011, and is a continuation in part of U.S. patent application Ser. No. 13/250,379, filed on Sep. 30, 2011, which is a continuation in part of U.S. patent application Ser. No. 12/844,798, filed on Jul. 27, 2010, which claims priority to U.S. Provisional Application No. 61/229,236, filed on Jul. 28, 2009, all of which are hereby incorporated by reference.

TECHNICAL FIELD

This disclosure relates to the field of touch-sensors and, in particular, to performing measurement scans of capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates X/Y movement using a collection of capacitive sensor electrodes, arranged along two defined axes, that detect the presence or proximity of one or more conductive objects, such as a finger. Mouse right/left button clicks can be replicated by two mechanical or capacitive-sensed buttons, located in the vicinity of the touchpad, or by tapping commands or other gestures on the touch-sensor pad itself. The touch-sensor pad provides a user interface device for performing such functions as positioning a pointer, or selecting an item on a display. These touch-sensor pads may include multi-dimensional sensor arrays for determining movement of the conductive object in multiple axes. The sensor array may include a one-dimensional sensor array, detecting movement in one axis. The sensor array may also be two dimensional, detecting movements in two axes.

Another user interface device that has become more common is a touch screen. Touch screens, also known as touch-screens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)), or photo-sensitive (infra-red). Such overlays allow a display to be used as an input device, removing the keyboard and/or the mouse as the primary input device for interacting with the displayed image's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
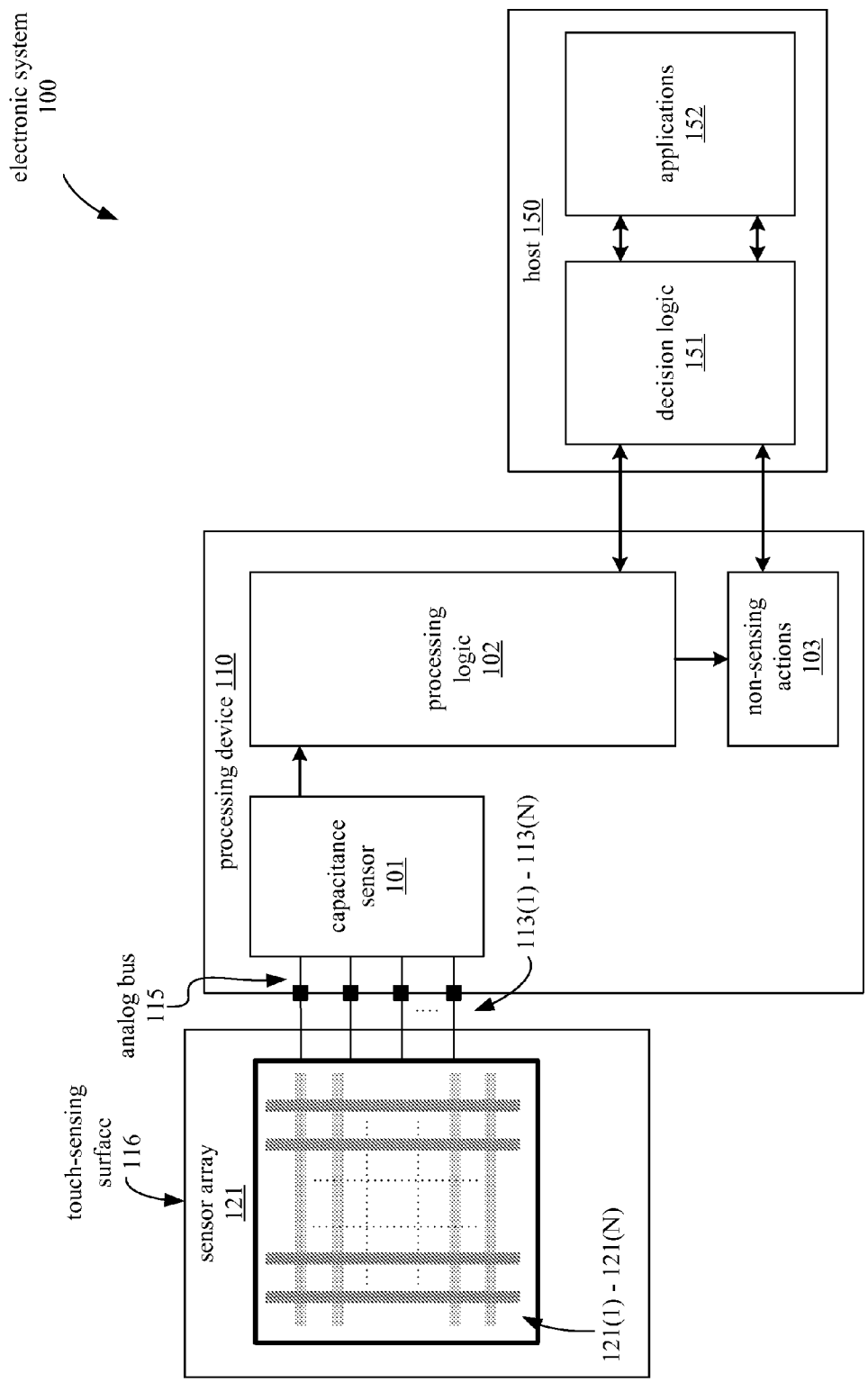
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a capacitive touch-sensing surface may be used to track locations of one or more conductive objects in contact or in close proximity to the touch-sensing surface by scanning each of a number of intersections between capacitive sensor electrodes. In one embodiment, a touch may be detected at the touch-sensing surface when a conductive object, such as a finger, contacts or is in close proximity to the touch-sensing surface. An intersection between two sensor electrodes may be understood as a location at which one sensor electrode crosses over or overlaps another, while maintaining galvanic isolation from each other. A scan may include a series of mutual capacitance measurements between pairs of intersecting sensor electrodes spanning all or a portion of the touch-sensing surface. An embodiment of scanning of such a capacitive touch-sensing surface within a touch-sensing device may decrease power consumption and increase noise immunity by limiting the number of intersections scanned for identifying a location of the one or more conductive objects. In one embodiment, limiting the number of scanned intersections may further increase accuracy, reduce response time, and improve refresh rate of the touch-sensing device.

In one embodiment, a processing device may perform a first scan of the touch-sensing surface to detect and resolve the location of a conductive object. Based on this resolved (i.e., calculated) location, the processing device may predict a location or a set of possible future locations for the conductive object. For example, the processing device may calculate a predicted location of the conductive object based on the last known or previously resolved locations, the velocity, the acceleration, or a mix thereof of the conductive object. Alternatively, the processing device may determine a search window including all or most of the locations that the conductive object is likely to be found during a subsequent scan. In one embodiment, the prediction may also be based on the duration between the first scan and the next subsequent scan. In one embodiment, the search window may be rectangular. In an alternative embodiment, the search window may be some other non-square or non-rectangular shape.

Having determined a search window associated with the predicted location of the conductive object, the processing device may invoke a scan of intersections within the search window, which may include intersections near the predicted location. The conductive object can thus be tracked over time by performing a series of local scans comprising the limited number of intersections where the conductive object is likely to be located. In the rare event that the location of the conductive object cannot be accurately resolved using data from a local scan, additional intersections, up to or including the whole panel, may be sensed in order to determine the location of the object.

FIG. 1 illustrates a block diagram of one embodiment of an electronic system 100 including a processing device 110 that may be configured to measure capacitances from a touch-sensing surface 116 including a capacitive sensor array 121. In one embodiment, a multiplexer circuit may be used to connect a capacitive sensor 101 with a sensor array 121. The electronic system 100 includes a touch-sensing surface 116 (e.g., a touchscreen, or a touch pad) coupled to the processing device 110, which is coupled to a host 150. In one embodiment the touch-sensing surface 116 is a two-dimensional sensor array 121 that uses processing device 110 to detect touches on the surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In an alternative embodiment without an analog bus, each pin may instead be connected either to a circuit that generates a TX signal or to an individual RX sensor circuit.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a touch detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output (i.e., density domain), instead of the raw counts being over or under a certain threshold.

In one embodiment, the processing device 110 further includes processing logic 102. Operations of the processing logic 102 may be implemented in firmware; alternatively, they may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), resolve where the object is on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be a Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as a user input device, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
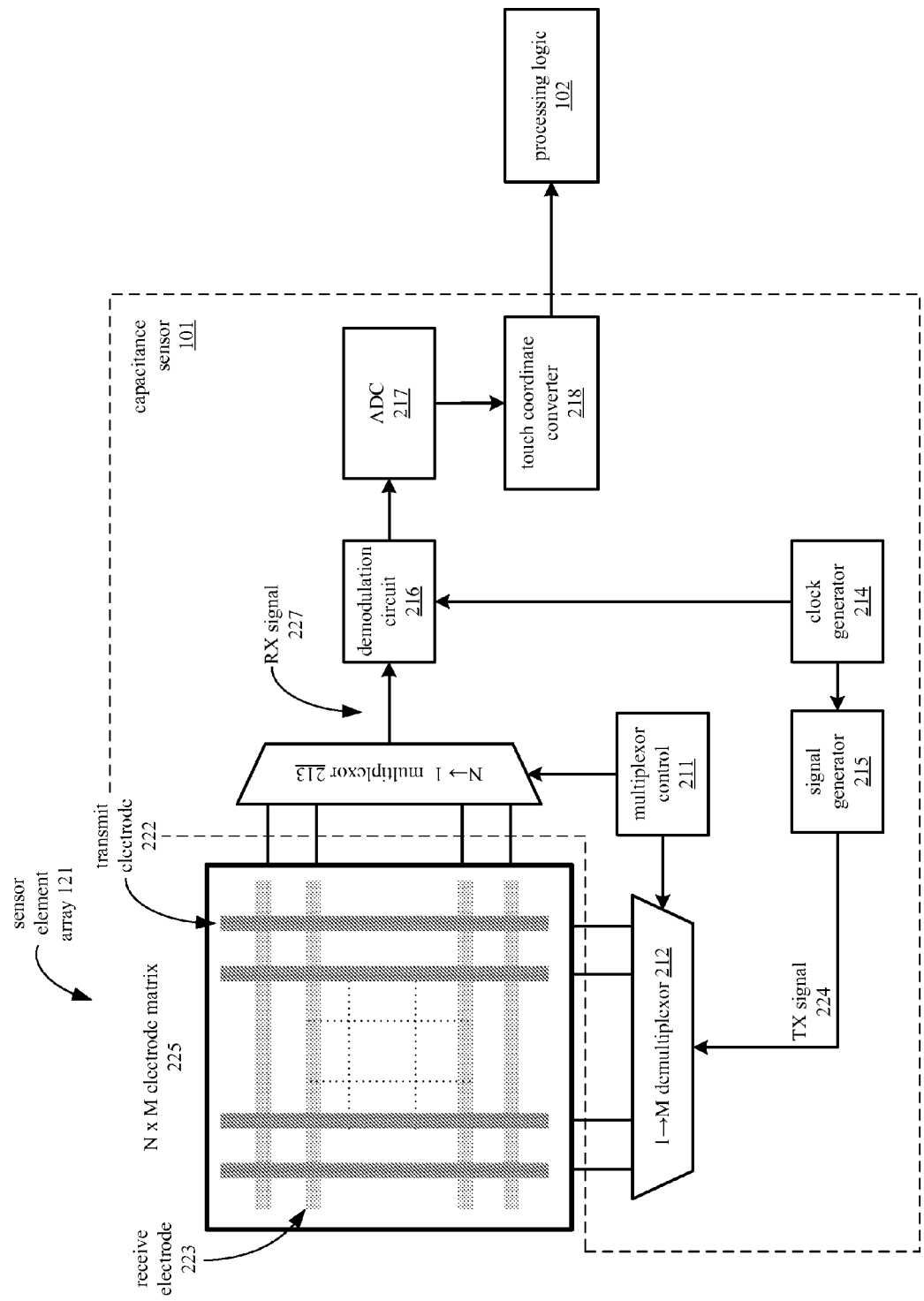
FIG. 2 is a block diagram illustrating an embodiment of an electronic system that processes touch sensor data.

FIG. 2 is a block diagram illustrating one embodiment of sensor array 121 composed of orthogonal electrodes and a capacitance sensor 101 that converts changes in measured capacitances to coordinates indicating the presence and location of touch. In one embodiment, the capacitance sensor 101 may measure mutual capacitances for intersections between the transmit and receive electrodes in the sensor array 121. The touch coordinates are calculated based on changes in the measured capacitances relative to the capacitances of the same touch sensor array 121 in an un-touched state. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 101 through demultiplexer 212 and multiplexer 213.

Capacitance sensor 101 includes multiplexer control 211, demultiplexer 212, multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of sensor array 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with the intersections of all TX electrodes and RX electrodes can be measured by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining changes in the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected, and the associated magnitude of capacitance change at each respective electrode.

The induced current signal 227 is integrated by demodulation circuit 216. The rectified current output by demodulation circuit 216 can then be filtered and converted to a digital code by ADC 217.

A series of such digital codes measured from adjacent sensor intersections, when compared to or offset by the associated codes of these same sensors in an un-touched state, may be converted to touch coordinates indicating a position of an input on touch sensor array 121 by touch coordinate converter 218. The touch coordinates may then be used to detect gestures or perform other functions by the processing logic 102.

Figure 3:
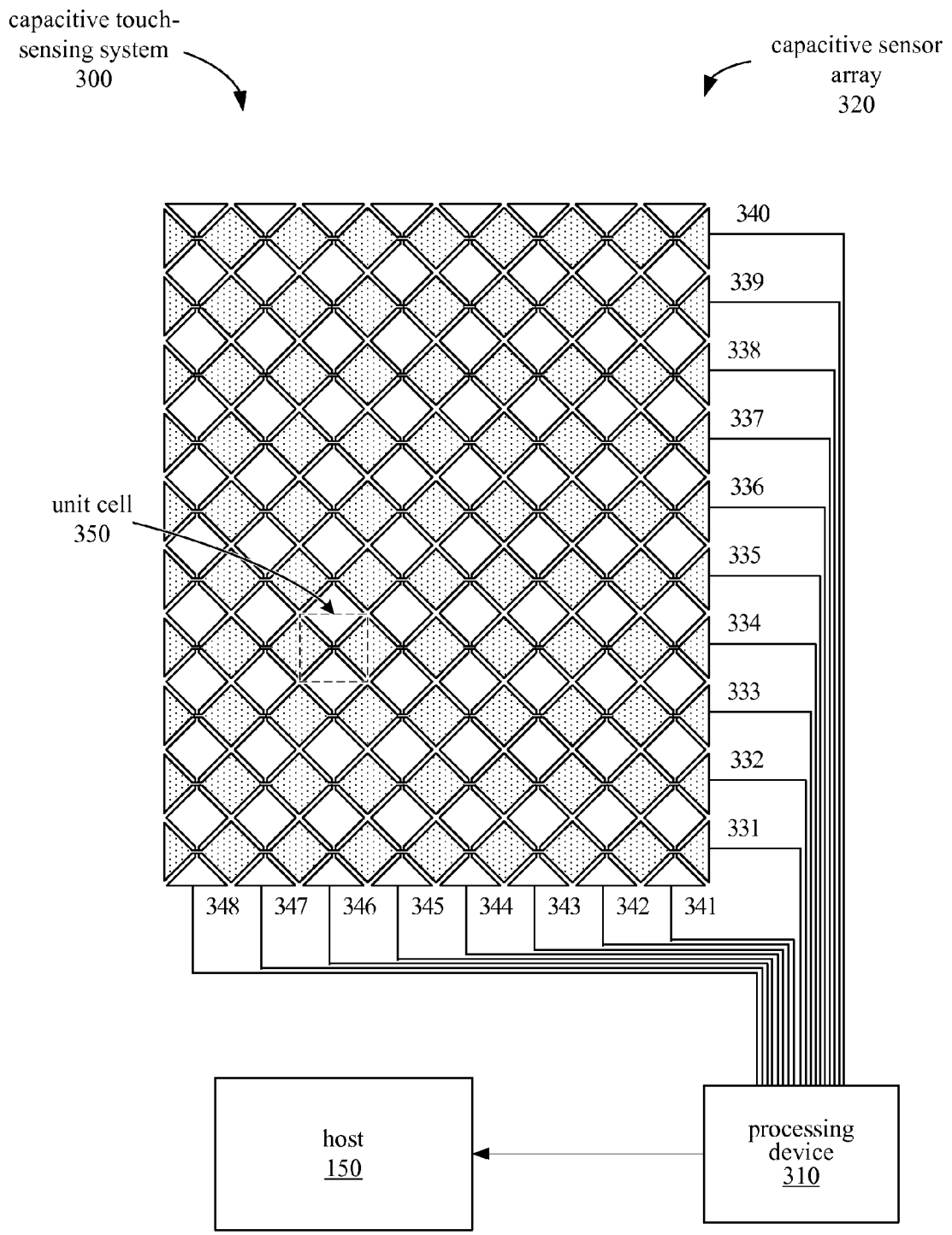
FIG. 3 illustrates an embodiment of a capacitive sensor array having a diamond pattern.

FIG. 3 illustrates an embodiment of a capacitive touch-sensing system 300 that includes a capacitive sensor array 320. Capacitive sensor array 320 includes a plurality of row electrodes 331-340 and a plurality of column electrodes 341-348. The row and column electrodes 331-348 are connected to a processing device 310, which may include the functionality of capacitance sensor 101, as illustrated in FIG. 2. In one embodiment, the processing device 310 may perform mutual capacitance measurement scans of the capacitive sensor array 320 to measure a mutual capacitance value associated with each of the intersections between a row electrode and a column electrode in the sensor array 320. The measured capacitances may be further processed to determine centroid locations of one or more contacts of conductive objects proximate to the capacitive sensor array 320.

In one embodiment, the processing device 310 is connected to a host 150 which may receive the measured capacitances or calculated centroid locations from the processing device 310.

The sensor array 320 illustrated in FIG. 3 includes sensor electrodes arranged to create a pattern of interconnected diamond shapes. Specifically, the sensor electrodes 331-348 of sensor array 320 form a single solid diamond (SSD) pattern. In one embodiment, each intersection between a row electrode and a column electrode defines a unit cell. Each point within the unit cell is closer to the associated intersection than to any other intersection. For example, unit cell 350 contains the points that are closest to the intersection between row electrode 334 and column electrode 346.

In one embodiment, a capacitive touch-sensing system may collect data from the entire touch-sensing surface by performing a scan to measure capacitances of the unit cells that comprise the touch-sensing surface, then process the data serially or in parallel with a subsequent scan. For example, one system that processes data serially may collect raw capacitance data from each unit cell of the entire touch-sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition.

In one embodiment, a touch-sensing system may be configured to perform one or both of self-capacitance sensing and mutual capacitance sensing. One embodiment of a capacitive touch-sensing system that is configured to perform self-capacitance sensing may, in sequence or in parallel, measure the self capacitance of each row and column sensor electrode of the touch-sensing surface, such that the total number of sense operations is N+M, for a capacitive sensor array having N rows and M columns. In one embodiment, the touch-sensing system may be capable of connecting individual sensor electrodes together to be sensed in parallel with a single operation. For example, multiple row and or column sensor electrodes may be coupled together and sensed in a single operation to determine whether a conductive object is touching or near the touch-sensing surface. In an alternate embodiment, the touch-sensing system may be capable of connecting each row sensor electrode to it is own sensor circuit such that all row electrodes may be sensed in parallel with a single operation. The touch-sensing system may also be capable of connecting each column sensor electrode to its own sensor circuit such that all column electrodes may be sensed in parallel with a single operation. The touch-sensing system may also be capable of connecting all row and column electrodes to their own sensor circuits, such that all row and column electrodes may be sensed in parallel with a single operation.

In one embodiment, a touch-sensing system may perform mutual capacitance sensing of the touch-sensing surface by individually sensing each intersection between a row electrode and a column sensor electrode. Thus, a total number of sense operations for a capacitive touch sensor having X rows and Y columns is X×Y. In one embodiment, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

In one embodiment, multiple capacitance sensing circuits may be used in parallel to measure a signal coupled to multiple column electrodes simultaneously, from a signal applied to one or more row electrodes. In one embodiment, for a capacitive sensor array having X rows, Y columns, and N columns that can be sensed simultaneously, the number of mutual capacitance sensing operations is the smallest whole number greater than or equal to X×Y/N.

The power consumption of a self-capacitance or mutual capacitance touch-sensing system may be decreased by limiting scans to a portion of the touch-sensing surface. Limiting the scan may further result in higher immunity from noise, as well as higher accuracy, response time, and refresh rate when tracking a conductive object.

As an example, a touch-sensing system may have X=16 rows, Y=24 columns, and N=8 columns that can be sensed simultaneously. Such a touch-sensing system, when configured to measure an 8×8 block of unit cells as a search window, may track a presence and location of a conductive object using 8 sensing operations for each update of the touch locations. The same system performing a scan of the entire touch-sensing surface would use 48 sensing operations per update. Thus, in this particular example, local scanning results in a 6× improvement in scan time and similar reduction in power to perform the scan.

In one embodiment, each update of the touch locations may include a sensing portion and a non-sensing portion. The sensing portion may include measurement of capacitance associated with intersections between sensor electrodes, while the non-sensing portion may include calculation of touch locations based on the capacitance measurements and reporting of the calculated touch locations to a host device.

In one embodiment, a 5.5 inch diagonal panel composed of >500 unit cells, using a 7×7 search window may reduce scanning time by a factor of >10, as compared to a full scan. This reduced scanning time may further affect many of the critical parameters of a touchscreen system, such as power consumption, signal to noise ratio, refresh rate, and accuracy.

Figure 4:
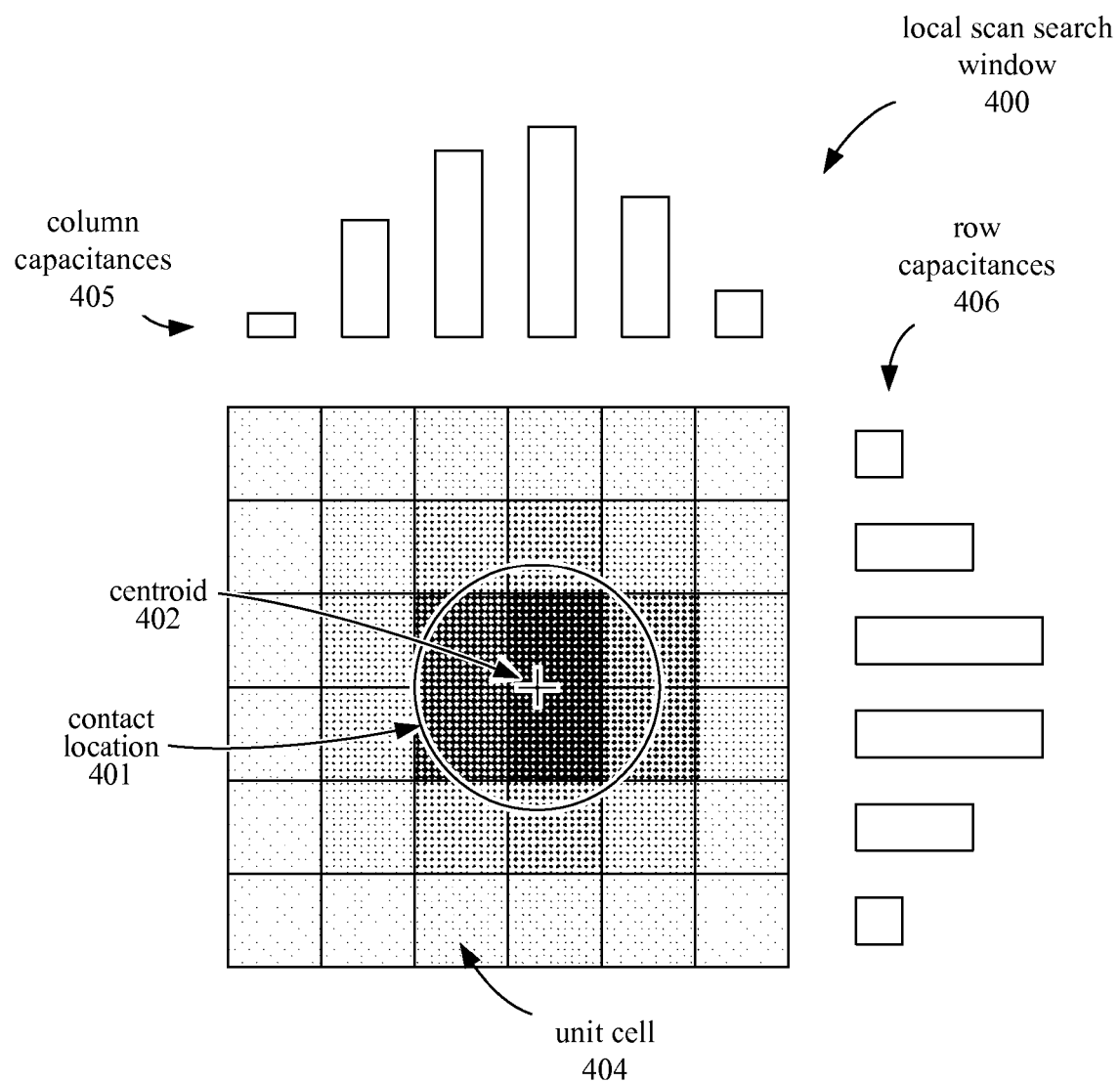
FIG. 4 illustrates unit cells and self-capacitance profiles of a touch proximate to a capacitive sensor array, according to an embodiment.

FIG. 4 illustrates a 6×6 grid of unit cells representing a portion of a capacitive sensor array, according to an embodiment. The illustrated grid includes unit cells that are affected by a contact or proximity of a conductive object. In one embodiment, each of the unit cells, such as unit cell 404, corresponds to an intersection between a row and column electrode in a capacitive sensor array 121. In FIG. 4, the shading of each unit cell indicates a magnitude of a change in mutual capacitance for that unit cell resulting from the presence of a conductive object at a contact location 401, with darker shading indicating a greater change in mutual capacitance. In one embodiment, the location of contact 401 is determined by a centroid 402 calculated from an array populated with the sensed capacitance values of each of the intersections within the local search window. In one embodiment, the contact location's centroid 402 is calculated using interpolation between all or a subset of the measured capacitance values in each of the X and Y directions, and by using most or all of the readings which exceed a noise threshold. By this method, the center of a contact by or presence of a conductive object can be calculated with much finer resolution than the pitch of electrodes used to make the sensor array. In another embodiment, only a subset of the measured capacitance values is used for the calculation.

In one embodiment, a size of a search window over which a touch-sensing system may perform a local scan may be determined based on an expected maximum velocity of a finger or other conductive object to be tracked by the touch-sensing system. For example, a capacitive sensor array may have an electrode pitch of 5 mm and may be scanned at a rate of 100 Hz. For a touch-sensing application, a finger on a touchscreen may move as fast as 1 meter per second over the sensor array, with speeds much faster than a few hundred millimeters per second being relatively uncommon.

In such a touch-sensing system, it will be unusual for a finger to have moved more than a few millimeters during a time interval between scans. Thus, the search window may be sized to include substantially all of the predicted locations of the conductive object, given the expected rate of travel of the conductive object. For example, the local scan may include all or a subset of the intersections within an 8×8 area of unit cells, which would be large enough to accommodate the maximum expected travel distance for the finger or other conductive object of a few millimeters per scan interval if the local scan window were centered on the centroid of the resolved touch in the previous scan.

In one embodiment, a touch-sensing system may determine a location of the search window over which to perform a local scan based on a predicted location of a conductive object, such as a finger. For example, the system may predict a location where a finger is expected to be during the time of a subsequent scan and perform a local scan including intersections of sensor electrodes around the predicted location. In one embodiment, the system identifies a search window, which is an area including intersections to be scanned during the local scan. In one embodiment, the search window includes the predicted location of the conductive object. In one embodiment the predicted location of the conductive object is the calculated location of the conductive object from the previous scan.

In one embodiment, the touch-sensing system uses the location of the conductive object, as determined by an initial scan, as the predicted location of the conductive object for a subsequent local scan. In one embodiment, the touch-sensing system may also account for the velocity or acceleration of a conductive object that is in motion. For example, the system may determine the last known position, velocity, and acceleration of the conductive object based on previously resolved positions of the conductive object in order to calculate a predicted location for the conductive object at a time when the subsequent local scan is scheduled to be performed.

In one embodiment, a process for locating a contact using a local scan begins by calculating an expected contact location. In one embodiment, a touch-sensing system may operate based on assuming that the contact location of a conductive object proximate to the touch-sensing surface is moving sufficiently slowly that the last known location of the contact can be used to approximate the predicted location of the contact for a subsequent scan.

In one embodiment, the suitability of using the last known contact location as a predicted location may depend on factors including the scanning rate of the touch-sensing system, the size of the sensor electrodes, the expected maximum velocity of the conductive object, and the size of the search window.

For example, a touch-sensing panel that is scanned at 200 Hz with a unit cell size of 5×5 mm, would still be able to locate a conductive object, such as a finger, moving at 200 Hz×5 mm=1 m/s using a search window that includes a border that is at least one additional "buffer" unit cell wide on all sides of the minimum area of unit cells used by the system for determining the centroid location of the contact. For example, if the touch-sensing system uses minimum of a 6×6 grid of unit cells to calculate the centroid location of the conductive object, the size of the search window would be 8×8 unit cells.

In an alternative embodiment, the predicted location of the conductive object may be based on previously determined locations of the contact location. In one embodiment, the previous locations of the contact may be used to calculate a velocity and acceleration of the contact. Calculation of the predicted contact location based on velocity may increase the accuracy of the prediction, particularly for a contact moving at a substantially constant rate. Compensating for acceleration of the moving contact may further increase the prediction accuracy for contacts that are not moving at a constant velocity.

Figure 5:
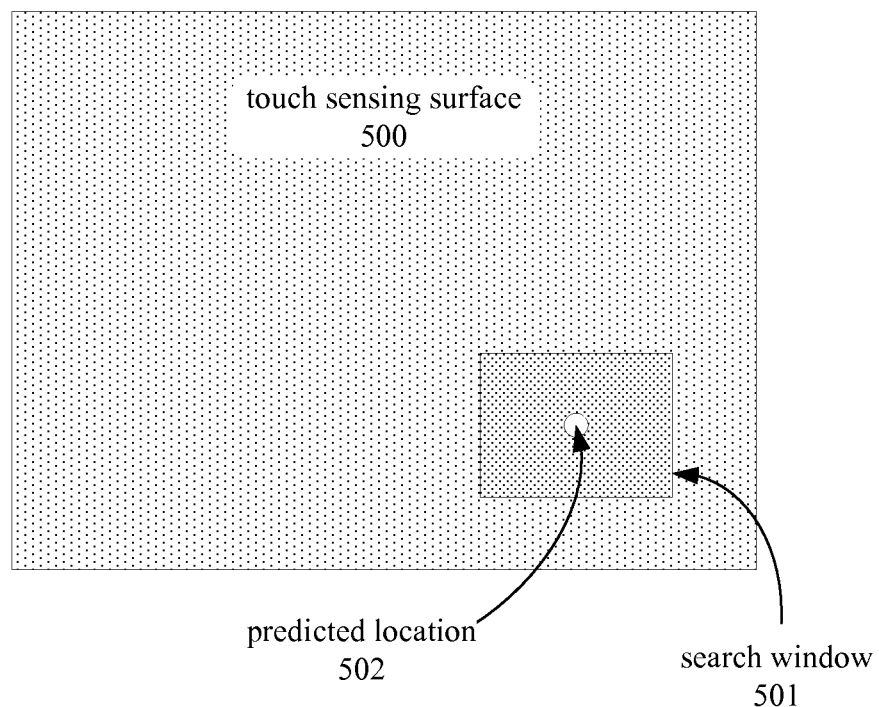
FIG. 5 illustrates an area of a touch-sensing surface, according to an embodiment.

FIG. 5 illustrates an area of a touch-sensing surface 500, according to an embodiment. As illustrated in FIG. 5, a search window 501 may cover a portion of the touch-sensing surface 500, and may be positioned such that the search window 501 contains the predicted location 502 for the conductive object. In one embodiment, the search window 501 may be centered to surround the predicted location 502.

Figure 6A:
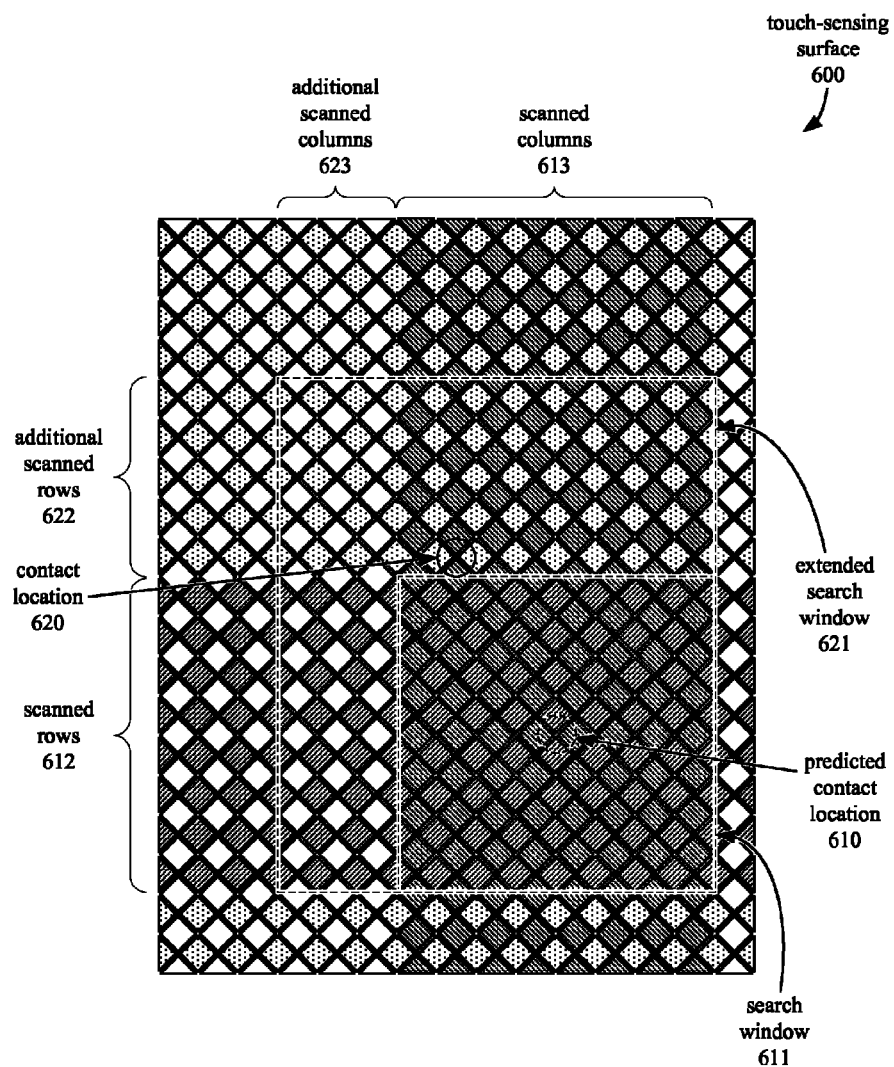
FIG. 6A illustrates a search window of a touch-sensing surface, according to an embodiment.

FIG. 6A illustrates a search window 611 of a touch-sensing surface 600, according to an embodiment. In one embodiment, one or more preceding touch contacts have been resolved to allow prediction of a contact location 610. In one embodiment, once the touch-sensing system has predicted a location 610, the touch-sensing system may perform self-capacitance or mutual capacitance measurements on sensor electrodes intersecting with other sensor electrodes within the search window 611. In one embodiment, the predicted contact location 610 is at the center of search window 611.

In one embodiment, the touch-sensing system scans the intersections within the search window 611 by performing capacitance measurements using the rows 612 and columns 613, the result of such measurements are used to resolve a location of the conductive object within the search window 611. In one embodiment, the capacitance measurements may be mutual capacitance measurements between individual row and column sensor electrodes. Alternatively, the touch-sensing system may perform a self-capacitance scan of each of the row electrodes 612 and column electrodes 613 to determine a detected location of the conductive object within the search window 611. For example, a self-capacitance scan of the row and column electrodes spanning local scan search window 400 may result in a self-capacitance profile including column capacitances 405 and row capacitances 406.

Capacitance measurements collected from scanning the search window 611 may be analyzed to determine whether a presence of a finger or other conductive object has been detected within the search area 611. In one embodiment, if a contact is detected wholly within the search area 611, the touch-sensing system may proceed with resolving a location of the conductive object based on the capacitance measurements. In one embodiment, a location can be resolved based on a minimum number of capacitance measurements. Thus, a location of a conductive object that is completely within the search window is resolvable using only capacitance measurements of unit cells formed of sensor electrodes that intersect within the search window. In contrast, a contact that is only partially within the search window may be resolved using the capacitance measurements of sensor electrodes intersecting within the search window 611, in addition to capacitance measurements of sensor electrodes intersecting outside the search window 611. In one embodiment, a contact may be detected to be only partially (i.e., not wholly) within the search window if the highest (or lowest) capacitance value in either the X or Y direction is within a predetermined number of intersections of the edge of the search window. In another embodiment, a contact may be determined to be only partially within the search window if the measured capacitance value at one or more (or another predetermined number) of the intersections forming the boundary of the search window differs more than a predetermined amount from a reference level; this predetermined level may be an absolute capacitance value, or may be a value relative to the highest or lowest capacitance value measured within the search window.

For example, a contact at location 610 may be completely within the search window 611, while a contact at location 620 may be partially within the search window 611. Notably, although the contact location 620 is centered outside of the search window 611, a contact at location 620 may still cause changes in capacitance measurable at some intersections inside the search window 611.

In response to failing to detect that the contact location is at least partially within the search window 611, the touch-sensing system may expand the size of the search window 611 by scanning intersections associated with additional sensor electrodes, such as columns 623 and rows 622. Thus, the initial search window 611 may be expanded to the extended search window 621, which includes the intersections between each of a set of rows, including rows 612 and rows 622, and each of a set of columns, including columns 613 and 623. Note that in some embodiments it may not be possible to distinguish between a touch having moved outside the search window and the conductive object having moved away from proximity to the touch-sensing surface. However, in one embodiment the system responds in the same way—by expanding the size of the search window. In one embodiment the search window may be increased to cover the entire touch-sensing surface. If no touch is detected within the expanded search window then it may be inferred that the conductive object is no longer proximate to the sensing surface.

For example, a finger may be proximate to the touch-sensing surface 600 at a touch location 620 even after the touch-sensing system has predicted a location 610 based on previously determined locations of the finger. In one embodiment, this situation may arise when the finger is removed and replaced on the touch-panel or has moved faster than can be accommodated by the prediction method.

In one embodiment, the touch-sensing system may extend the search window 611 by the same number of intersections in each direction. For example, an extended search window may include unit cells within the initial search window and a boundary of unit cells, one or more unit cells wide, on each of the four sides of the initial search window, while not extending the search window beyond the limits of physically present sensor electrodes. Alternatively, the touch-sensing system may extend the search window 611 in a direction depending on the capacitances measured from within the search window 611, or a predicted direction of travel of the contact.

In one embodiment, the touch-sensing system may extend the initial search window by scanning additional intersections on the same side as the largest magnitude of change in capacitance measured within the initial search window. This process accommodates situations where a contact at location 620 is partially within the initial search window 611, or at least causes measurable changes in capacitance at the intersections within the search window 611. In one embodiment, the search window 611 may be extended until a minimum sufficient amount of capacitance data for resolving the contact location is collected.

In one embodiment, the touch-sensing system may extend the search window 611 in the same direction as a direction of travel of the contact. For example, the touch-sensing system may extend the search window 611 upwards and to the left (with reference to FIG. 6A) to find the position of a contact that is traveling from location 610 to location 620, in response to determining that the contact influenced the capacitance of intersections not completely within the search window 611.

In one embodiment, if a touch-sensing system is not able to detect a presence of a contact based on a local scan limited to a search window, the touch-sensing system may extend the search to scan the entire capacitive sensor array. Thus, the touch-sensing system may be able to locate the contact even if the contact travels completely outside the search window, such that the conductive object does not affect any capacitance measurements within the search window 611.

In one embodiment, a touch-sensing system implementing the local scan method may also be configured to detect the presence of additional conductive objects while tracking an initial contact using the local scan method, to allow local scanning to be used with multi-touch applications. There are several methods that can be used to detect new contacts, including detecting one or more secondary capacitance peaks within an existing local scan window, detecting a change in the total self-capacitance of the capacitive sensor array, detecting a change in the self capacitance of sensor electrodes not already measured as part of the local scan window, or scanning all or part of the sensor array using self or mutual capacitance sensing methods.

In one embodiment, a touch-sensing system may perform a scan of the remaining area of the touch-sensing surface, in addition to the area of the local scan, in order to detect the presence of additional conductive objects, such as additional fingers proximate to the touch-sensing surface.

In one embodiment, a quick detection of a first new contact at the touch-sensing surface may be performed using a single self-capacitance measurement of the entire sensor, which may be performed in a single touch detection and resolution cycle. In one embodiment, when there is no touch location currently being tracked, the detecting the presence of a new touch may include a self-capacitance sensing of sensor electrodes of only one axis. Once a touch is detected, then that touch can be localized and verified to be a single touch by a self-capacitance measurement of the second axis. If more than one touch is present, then one or more fine scans using mutual capacitance may be used to resolve the locations of the individual touches. In one embodiment where the self capacitance measurements are of low spatial resolution or low signal-to-noise resolution to only perform reliable detection of touch presence, resolution of touch location may always be performed using mutual capacitance fine scans.

In one embodiment, the sensor array may be sensed in sections to detect a new contact by electrically coupling multiple sensor electrodes to make up such sections. In one embodiment, the sections may be adjacent, but non-overlapping. Alternatively, a touch-sensing system may sense three overlapping sections of a capacitive sensor array, with each section covering approximately half the area of the entire capacitive sensor array. In one embodiment, a touch-sensing system with overlapping sections may more easily detect the presence of a conductive object in an overlapping area, particularly when the change in measured capacitance caused by the conductive object is relatively small. Specifically, when measuring large areas, a change in capacitance caused by a single finger may be small, such that if the finger is located at a boundary between two non-overlapping sections, the change in measured capacitance may be insufficient to be detected as a presence. For systems having a capacitance sensor with multiple sensing channels, the self-capacitance of all row, all column, or all row and column sense electrodes can all be measured in parallel, wherein each sense electrode may be connected to a separate sensing channel.

In one embodiment, the touch-sensing system may detect the presence of additional contacts by scanning all or part of the capacitive sensor array using mutual-capacitance sensing methods. Depending on the ratio of sensor pitch to a minimum expected contact size, the intersections of the sensor electrodes may be sensed according to various patterns, such as striped or checkerboard patterns. In one embodiment, the touch-sensing system may sense intersections associated with alternate rows and columns to detect the presence of a contact. Alternatively, a touch-sensing system may sense intersections associated with every third row and column to detect the contact. In an alternate embodiment, those intersections not measured in a first sensing of the touch-sensing surface when looking for touch presence, are measured in a subsequent sensing of the surface, such that over time all intersections are measured. For example, if every other intersection of the touch-sensing surface comprising a checkerboard pattern is measured for touch presence in a first scan of the touch-sensing surface, the remaining intersections, not measured in the first scan, may be measured in the following scan.

Figure 6B:
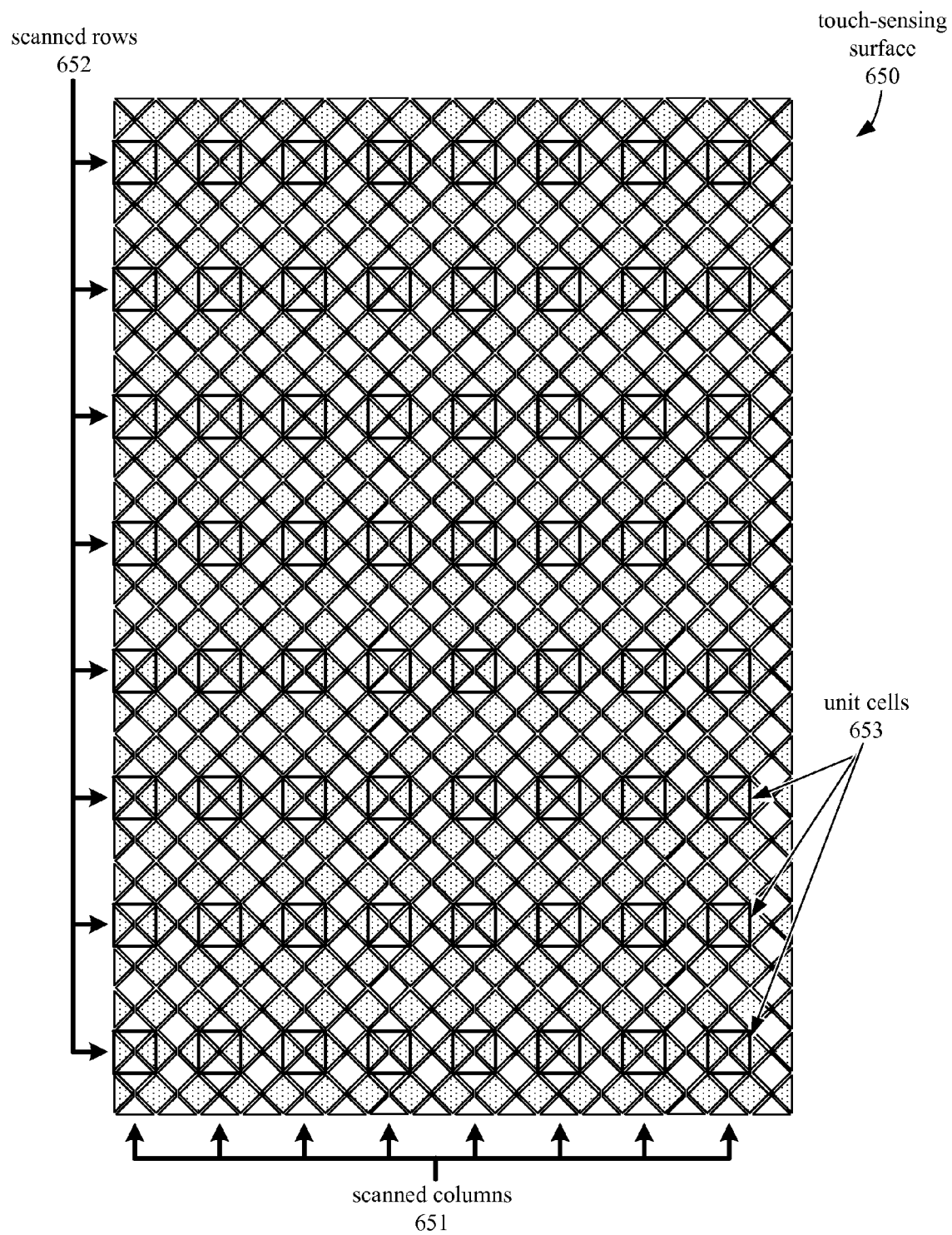
FIG. 6B illustrates a touch-sensing surface, according to an embodiment.

For example, FIG. 6B illustrates an embodiment of a touch-sensing surface 650 including a 16×24 sensor array with N=8. A touch-sensing system may detect a contact at the touch-sensing surface 650 by performing a self or mutual capacitance scan that includes scanning one of every three rows (rows 652) in conjunction with alternating columns (columns 651). Mutual capacitance measurements are thus performed for the unit cells (including unit cells 653) at the intersections of the scanned rows 652 and columns 651. Alternatively, the touch-sensing system may apply a TX signal to multiple rows simultaneously. In one embodiment, these rows may be interleaved with rows associated with intersections that are not sensed.

In one embodiment, a scan for new contacts may be performed at a lower rate than a tracking of a known contact using a local scan. In one embodiment, a scan of the entire sensor array to detect a new additional contact may be performed over several local scan periods. For example, a touch-sensing system may perform a self-capacitance scan of each of three sections, where one section is scanned for new contacts after every local scan for tracking a known contact. In such a case, with a 200 Hz update rate for local scan tracking, the typical "touch latency" for detecting a new contact would be approximately 15 ms to 20 ms.

In one embodiment where new contacts are detected using mutual capacitance measurements, the mutual capacitance scan for new contacts may be interleaved between one or more local scans. For example, if 12 mutual capacitance sensing operations (corresponding to alternating rows and columns and N=8 channels and measuring 48 independent intersections) are used to find new contacts over the full area of the touch-sensing surface, then three rows may be sensed after each local scan, resulting in a 20 ms typical latency for detecting new contacts. Note that when performing these new contact scans, in one embodiment the area already covered by a local scan may be excluded since it has already been measured.

Figure 6C:
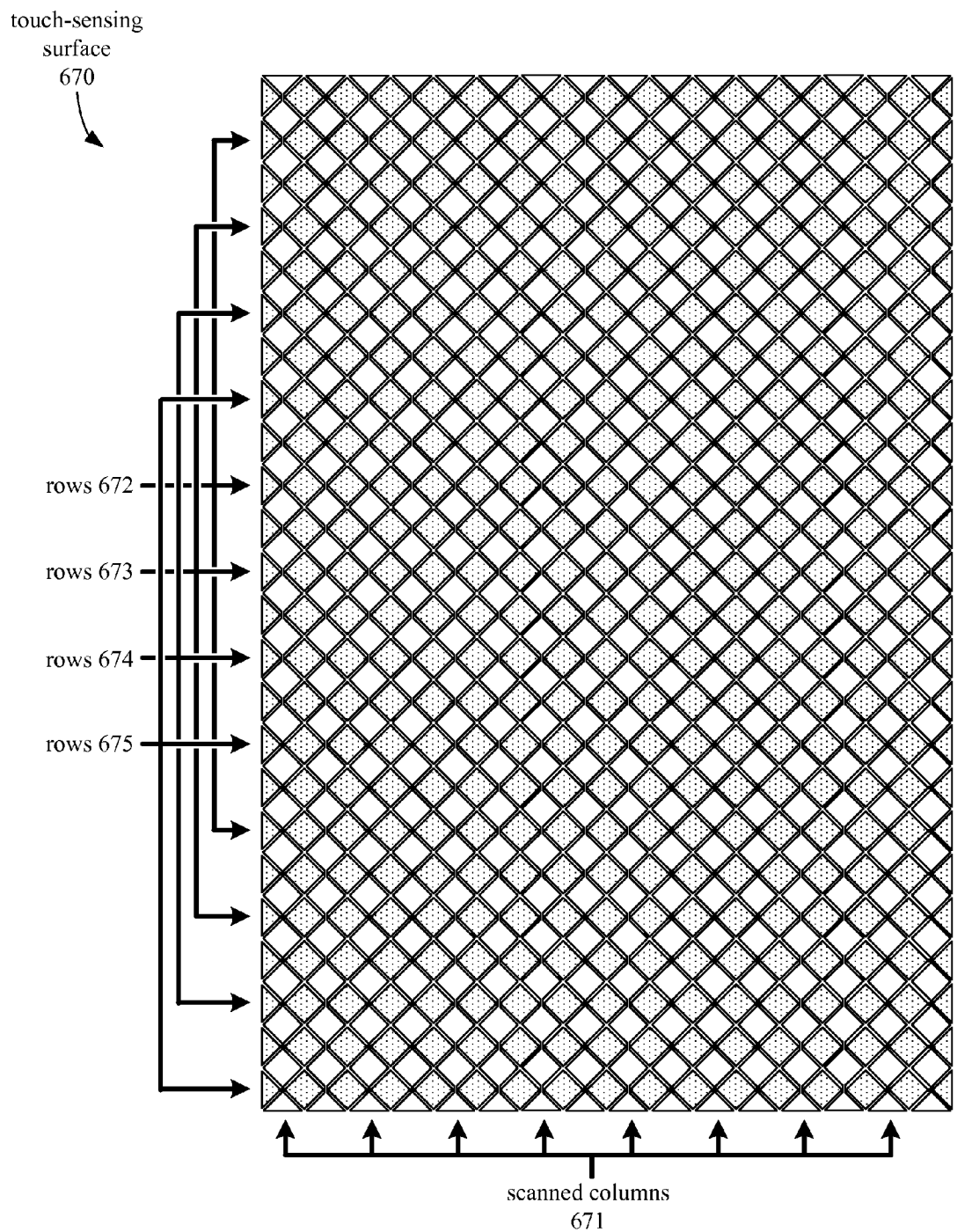
FIG. 6C illustrates a touch-sensing surface, according to an embodiment.

FIG. 6C illustrates an embodiment of a touch-sensing surface 670 with a 16×24 capacitive sensor array and N=8 channels, for which a set 671 of 8 columns of the 16 columns can be sensed simultaneously, with alternate rows being driven for a total of 8×12=96 capacitance measurements. In one embodiment, some of the rows may be driven with a true TX signal, while others may be driven with a complement TX signal. The 12 rows being driven may be driven in four sets of 3, such that the first set 672, second set 673, third set 674, and fourth set 675 of 3 row electrodes are driven in sequence after a first, second, third, and fourth local scan, respectively. In one embodiment, intersections corresponding to all 3 of the interleaved rows in each set 672-675 may be sensed together by driving all 3 rows simultaneously, thus reducing the new touch detection operation to a single mutual capacitance operation for each local scan.

In one embodiment, the local scan is used only when tracking the location of a single conductive object in contact with or proximate to the touch-sensing surface. Alternatively, the local scan may be used to track a number of proximate conductive objects, such as finger touches.

In one embodiment, the system may use the local scan method for tracking a limited number of touches in a system that is capable of tracking more than the limited number of contacts. For example, a touch-sensing system capable of tracking up to ten contacts may use the local scan mode when tracking up to two simultaneous contacts at the touch-sensing surface, and may switch to a different mode for tracking more than two contacts. In this example, two separate search windows may be used when tracking two fingers. In one embodiment, if the two search windows overlap, a single larger window may be used for as long as the two centroids are within a predetermined distance of each other.

Figure 7:
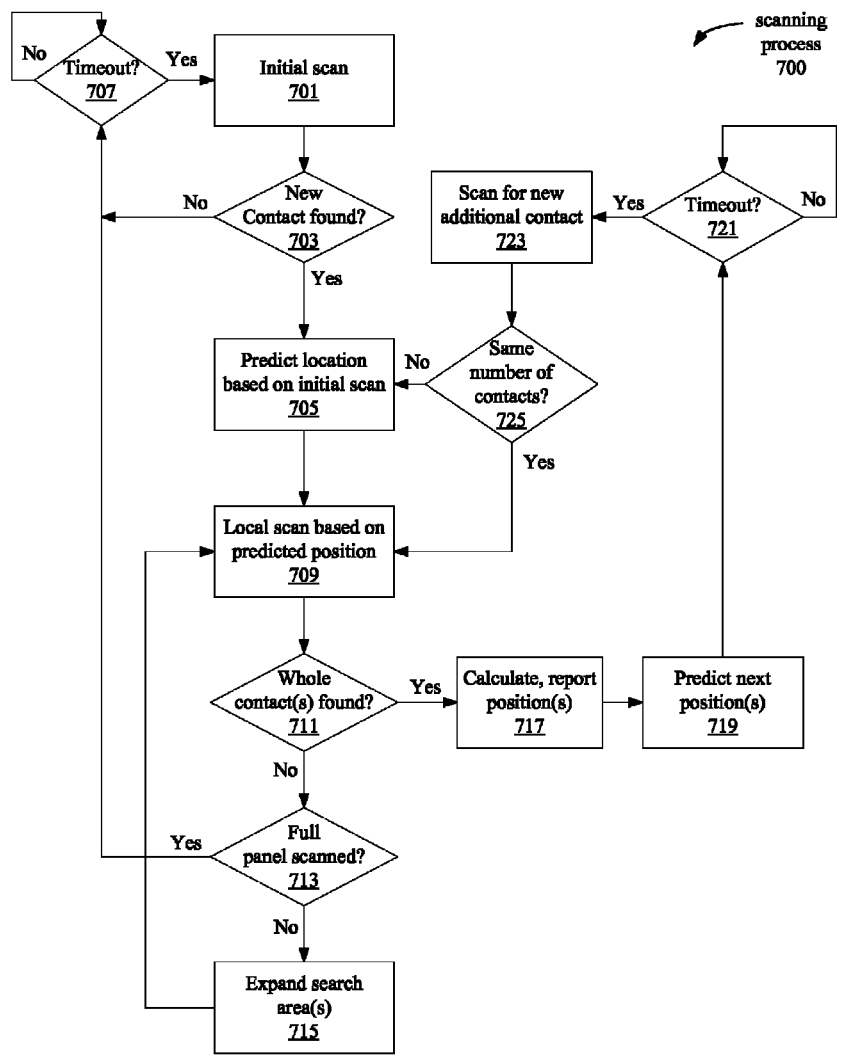
FIG. 7 is flow diagram illustrating a process for scanning a capacitive touch sensor array, according to an embodiment.

FIG. 7 illustrates an embodiment of a process 700 for scanning a touch-sensing surface. In one embodiment, the scanning process 700 may be implemented in a touch-sensing system such as the system illustrated in FIG. 2. In one embodiment, the touch-sensing system may be capable of performing both mutual capacitance and self-capacitance measurements. In one embodiment, the process 700 comprises operations that may be performed in either a processing device such as processing device 110, or in a host such as host 150. Alternatively, the operations of process 700 may be divided between a processing device and a host.

In one embodiment, scanning process 700 begins at block 701, prior to which time no contacts are detected to be present at the touch-sensing surface. At block 701, the touch-sensing system may perform an initial scan of the touch-sensing surface to detect the presence of a new contact at the touch-sensing surface. In one embodiment, the scan at block 701 may be a self-capacitance scan of electrodes comprising one axis of the touch-sensing surface, such as touch-sensing surface 600, as illustrated in FIG. 6A. If the self-capacitance scan of one axis indicates a contact is present, the alternate axis is also scanned to allow prediction of a touch location along both axes. In one embodiment, a self-capacitance scan that indicates more than one touch may cause the system to switch to a mutual capacitance scanning method to determine the number of touches. In an alternative embodiment, the initial scan may be a mutual capacitance scan of all the intersections, or a subset of intersections of the sensor electrodes. From block 701, the process 700 continues at block 703.

At block 703, if the presence of a new contact was not detected by the initial scan of block 701, the process 700 continues back to block 701 after a timeout at block 707. Thus, the initial scan for a new contact repeats periodically until a new contact is detected. If, at block 703, a new contact was detected by the initial scan of block 701, the process 700 continues at block 705.

At block 705, the system may predict a location of a contact based on the initial scan performed at block 701. From block 705, the process 700 continues at block 709.

At block 709, the touch-sensing system may perform a local scan to collect raw capacitance data from sensor unit cells around the predicted contact location. In one embodiment, if the contact is a new contact as identified at block 703, then the predicted contact location may be taken as an approximate location of the new contact as determined by initial scan performed at block 701. Thus, the local scan of block 709 may be performed within a search window surrounding an approximate location of the new contact as determined by the full panel or initial scan of block 701. In one embodiment, the search window may be centered around the predicted contact location. For example, search window 611 of FIG. 6A is centered around predicted contact location 610. In one embodiment, the local scan is performed on unit cells within a search window, such as search window 501 or 611, as illustrated in FIGS. 5 and 6A, respectively. From block 709, the process 700 continues at block 711.

At block 711, the system determines whether the raw capacitance data represents a whole contact. In one embodiment, a centroid location for a whole contact can be determined based on only the capacitance values measured from within the search window. In contrast, a centroid location for a partial contact may be determined based on capacitance values measured from within the search window in addition to capacitance values measured from outside the search window. If the touch-sensing system determines that the capacitance data does not represent a whole contact, the process 700 continues at block 713. If the touch-sensing system instead identifies a whole contact, or that a partial contact is found near the perimeter area of the touch sensing surface wherein expanding the search window will not provide additional capacitance data, the process 700 continues at block 717.

At block 713, the system determines whether the full panel has been scanned. If, at block 713, the full panel has been scanned, then a whole contact or partial contact along the perimeter was not found within the bounds of the entire touch sensing panel, and the panel no longer has a touch or contact present. Accordingly, the process 700 continues back to block 707 and 701, where a new initial scan is performed after a timeout to look for a new touch or contact to occur. If, at block 713, the full panel has not been scanned, then the system continues at block 715.

At block 715, the system may expand the search area, and a local scan may be performed on the extended search window at block 709 to obtain additional capacitance data for locating a whole contact, or further resolving a location of any partial contact that may have been found by the scan at block 709. For example, the touch-sensing system may scan unit cells in an extended search window, such as extended search window 621, as illustrated in FIG. 6A. Thus, the blocks 709-715 may be repeated until at block 711, either a whole contact is found, or the entire panel is scanned without finding a whole contact or partial contact along the perimeter of the panel. If a whole contact or partial contact along the perimeter of the panel is not found after scanning the full panel, then the process 700 continues from block 713 to block 701 after a timeout 707. If a whole contact is found, then the process 700 continues from block 711 to block 717.

At block 717, the touch-sensing system calculates a resolved contact location of the whole contact or partial contact along the perimeter of the panel, based on the capacitance data from block 709. The touch-sensing system may report the location as touch coordinates to a host computer, such as host 150 of FIG. 1. From block 717, the process 700 continues to block 719.

At block 719, the touch-sensing system predicts a contact location. In one embodiment, when only initial locations have been determined for one or more contacts, the predicted contact location may be the same as the resolved contact locations, as calculated at block 717.

In one embodiment, the predicted contact location may be based on a previous scan, such as the scan at block 701, 709, or 723, where the predicted contact location is associated with a time of a subsequent scan. In one embodiment, the prediction of the contact location may be based on one or more previously determined locations of the same contact. For example, the touch-sensing system may determine a velocity or acceleration for the contact based on previous locations of the contact, and may determine a predicted location that accounts for the velocity or acceleration. Alternatively, the touch-sensing system may use a last known location of the contact, such as the contact location determined at block 717, as the predicted location of the contact.

In one embodiment, the next predicted location following the resolution of a first touch location may be centered on the first touch location. Once the second touch location is resolved, the two touch locations and their associated time of measurement may be mathematically evaluated to provide a velocity vector that may be used to predict a location for the third scan. Once three resolved touch locations are available, then an acceleration of the conductive object can be determined. In one embodiment, the previous one, two, or three resolved locations of the touch can then be used for a subsequent prediction depending on the velocity and acceleration. In one embodiment, the previously resolved locations of the touch may also be used to shape the area of the fine scan window. If the acceleration is 0, then the last two points may be used. If the velocity is zero, then the last point may be used in the prediction. The predicted location of touch determined in block 719 may be used for a local scan performed as provided at block 709. From block 719, the process 700 continues at block 721.

In one embodiment, either after or before block 719 there will be some delay to control the scanning rate of the touch-sensing system. For example, the system may include a timer (e.g., a 5 ms timer for a 200 Hz system), such that before or after block 719, the system will wait until the timer indicates that 5 ms has passed since the start of the previous scan. Block 721 represents a timeout occurring after block 719, which may be implemented by such a timer.

At block 721, when the timeout has elapsed, the process 700 continues at block 723. Accordingly, in one embodiment, the timeout determines an interval for periodically scanning for new contacts, as provided at block 723.

At block 723, a touch-sensing system may perform a scan of a touch-sensing surface to detect a new additional contact at the touch-sensing surface. In one embodiment, the scan may be a mutual capacitance scan of a touch-sensing surface, such as touch-sensing surface 600, as illustrated in FIG. 6A. In one embodiment, the scan may be a self-capacitance scan of a touch sensing surface. In one embodiment, the scan at block 723 may cover the entire sensing area of a touch-sensing surface to detect a new contact anywhere in the sensing area. From block 723, the process 700 continues at block 725.

In one embodiment, the number of contacts at the touch-sensing surface may change because of the addition of an initial contact (as detected by the scan at block 701), or the introduction of a new additional contact (as detected by a scan according to block 723) to a set of contacts already detected at the touch-sensing surface. In one embodiment, if the number of contacts has increased, the touch-sensing system locates the one or more new contacts by performing a full self-capacitance scan (both axes, for a single contact) or mutual capacitance scan (for multiple contacts) of the entire touch-sensing panel.

At block 725, based on the scan performed at block 723, the touch-sensing system determines whether the number of contacts at the touch-sensing surface has changed since the previous scan. In one embodiment, the number of contacts at block 725 may change because a contact was added to or removed from the touch-sensing surface. From block 725, if the number of contacts has not changed, then the process 700 continues at block 709, where the system may perform a local scan based on the predicted position from block 719. Otherwise, if the number of contacts has changed, then the process 700 continues at block 705, where the system predicts a contact location.

In one embodiment, the process 700 thus repeats while the touch-sensing system is in operation to continuously track the locations of one or more conductive objects on or proximate to the touch-sensing surface.

In one embodiment, the local scanning and additional contact detection methods are not limited to detection and tracking of fingers, but may be used to track other objects such as active or passive styli, or may be used to detect and track conductive objects in proximity to, but not necessarily contacting, the touch-sensing surface. In one embodiment, the local scanning and additional contact detection methods may also be applicable to non-capacitive touchscreen sensing methods which use an array of sensing locations.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
based on a first scan of a set of sensor electrodes of the touch-sensing surface, calculating a first resolved location for a conductive object proximate to a touch-sensing surface, wherein the first resolved location is represented as touch coordinates identifying a point on the touch-sensing surface where the conductive object is located;
predicting an approximate location for the conductive object based on the first resolved location, wherein the predicting comprises selecting a subset of sensor electrodes within an area surrounding the approximate location to be scanned in a second scan; and
determining a second resolved location for the conductive object in the second scan based on the predicted approximate location by,
scanning the subset of sensor electrodes of the touch-sensing surface without scanning the entire set of sensor electrodes, wherein the number of sensor electrodes in the subset of sensor electrodes is fewer than the number of sensor electrodes in the set of sensor electrodes;
identifying that the conductive object is located at an edge of the area or outside of the subset of the sensor electrodes based on the scanning of the subset of sensor electrodes; and
in response to identifying that the conductive object is located at the edge of the area or outside the subset of sensor electrodes, scanning at least one or more additional rows or columns of sensor electrodes that are adjacent to the subset of sensor electrodes without scanning the entire set of sensor electrodes.

2. The method of claim 1, wherein the subset of sensor electrodes comprises sensor electrodes that intersect with other sensor electrodes within the area surrounding the predicted approximate location.

3. The method of claim 1, wherein the predicting the approximate location for the conductive object comprises calculating a velocity of the conductive object.

4. The method of claim 1, wherein the predicting the approximate location for the conductive object comprises selecting the first resolved location as the predicted approximate location.

5. The method of claim 1, wherein the predicting the approximate location for the conductive object comprises calculating an acceleration of the conductive object.

6. The method of claim 1, further comprising:
tracking a resolved location of the conductive object by performing a series of mutual capacitance scans, wherein the second scan is one of the series of mutual capacitance scans; and
detecting an additional conductive object proximate to the touch-sensing surface by performing a self-capacitance scan for a new contact over at least a portion of the touch-sensing surface during a time between mutual capacitance scans of the series of mutual capacitance scans.

7. The method of claim 6, wherein scanning for the new contact comprises:
electrically coupling a set of sensor electrodes to each other, and
measuring a self-capacitance of the electrically coupled set of sensor electrodes.

8. The method of claim 6, wherein the self-capacitance scan comprises a second subset of sensor electrodes representing fewer than all of the sensor electrodes of the touch-sensing surface.

9. A method comprising:
calculating a resolved location of a conductive object proximate to a touch-sensing surface based on a first scan of the touch-sensing surface, wherein the resolved location is represented as a plurality of touch coordinates identifying, a point on the touch-sensing, surface where the conductive object is located;
calculating a search window of predicted locations of the conductive object based on a time duration between the first scan and a second scan, wherein the search window comprises intersections of sensor electrodes within an area surrounding the predicted location, wherein the area included in the search window is less than an area of the touch-sensing surface;
performing the second scan, wherein the second scan comprises mutual capacitance measurements of the intersections of sensor electrodes within the search window;
determining that the conductive object is not within the search window or at an edge of the search window;
in response to determining that the conductive object is not within the search window or at the edge of the search window, expanding the search window in at least one dimension to include one or more additional intersections of sensor electrodes;
performing an additional scan, wherein the additional scan comprises mutual capacitance measurements of the one or more additional intersections of sensor electrodes within the expanded search window; and
calculating a second resolved location of the conductive object proximate to the touch-sensing surface based on the second scan and the additional scan of the touch-sensing surface.

10. The method of claim 9, wherein the calculating the search window comprises calculating a velocity of the conductive object.

11. The method of claim 9, wherein the calculating the search window comprises calculating an acceleration of the conductive object.

12. The method of claim 9, further comprising:
tracking a resolved location of the conductive object by performing a series of mutual capacitance scans, wherein the second scan is one of the series of mutual capacitance scans; and
detecting an additional conductive object at the touch-sensing surface by performing a self-capacitance scan of at least a portion of the touch-sensing surface between mutual capacitance scans of the series of mutual capacitance scans.

13. The method of claim 9, wherein the search window is expanded to include an expanded area that is less than the area of the entire touch-sensing surface.

14. The method of claim 9, wherein the search window is expanded based on a direction of movement of the conductive object.

15. The method of claim 9, wherein the search window is expanded to include additional intersections nearest an intersection having a highest measured capacitance value.

16. The method of claim 9, further comprising performing the initial scan, wherein the performing the initial scan comprises:
performing a first self-capacitance scan of sensor electrodes disposed in a first axis of the touch-sensing surface; and
performing a second self-capacitance scan of sensor electrodes disposed in a second axis of the touch-sensing surface only when the conductive object is detected in the first self-capacitance scan in the first axis, and wherein the performing the second scan comprises performing a mutual capacitance scan.

17. The method of claim 9, wherein the determining that the conductive object is not within the search window or at the edge of the search window comprises determining whether capacitance data of the second scan represents a whole contact of the conductive object within the search window or a partial contact of the conductive object, and wherein the search window is expanded when the capacitance data represents the partial contact.

18. A touch-sensing system comprising:
a capacitive sensor array comprising a plurality of sensor electrodes;
a capacitance sensor configured to measure capacitance for each of a plurality of intersections between pairs of sensor electrodes of the plurality of sensor electrodes; and
processing logic configured to:
calculate a resolved location of a conductive object proximate to a touch-sensing surface based on a first scan of the touch-sensing surface;
predict an approximate location for the conductive object based on the resolved location;
identify a search window of predicted locations of the conductive object based on a time duration between the first scan and a second scan, wherein the search window comprises a subset of intersections of the plurality of sensor electrodes within an area surrounding the predicted approximate location, wherein the area included in the search window is less than an area of the touch-sensing surface;
in response to the second scan, determine that the conductive object is not within the search window or at an edge of the search window, wherein the second scan comprises mutual capacitance measurements of the subset of intersections within the search window;
expand the search window in at least one dimension to include one or more additional intersections of sensor electrodes for an additional scan in response to the conductive object not being within the search window or at the edge of the search window, wherein the additional scan comprises mutual capacitance measurements of the one or more additional intersections of the plurality of sensor electrodes within the expanded search window; and
calculate a resolved location of the conductive object based on scanning the subset of intersections within the search window and scanning the one or more additional intersections without scanning all the plurality of electrodes.

19. The touch-sensing system of claim 18, wherein the predicted approximate location is extrapolated based on at least one previously determined location of the conductive object.

20. The touch-sensing system of claim 18, wherein the capacitance sensor is further configured to:
- perform the second scan as one of a series of mutual capacitance scans, and
- perform a self-capacitance scan of at least a portion of the touch-sensing surface between mutual capacitance scans of the series of mutual capacitance scans; and wherein the processing logic is further configured to:
- track a resolved location of the conductive object over time based on the series of mutual capacitance scans, and
- detect an additional conductive object at the touch-sensing surface based on the self-capacitance scan.

\* \* \* \* \*